April 2, 1940.   A. L. PARKER   2,196,120
VALVE MECHANISM
Filed Sept. 9, 1937
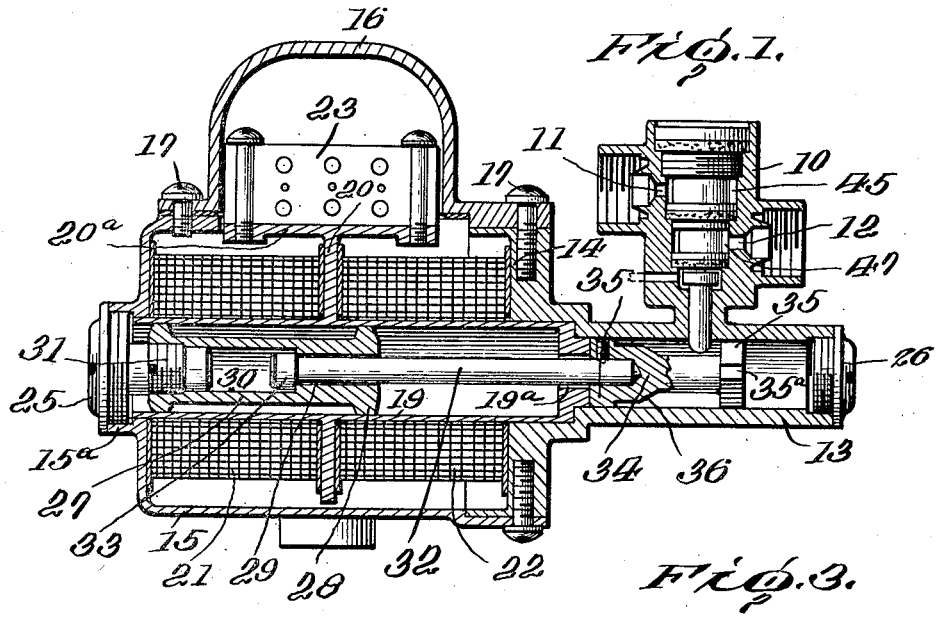
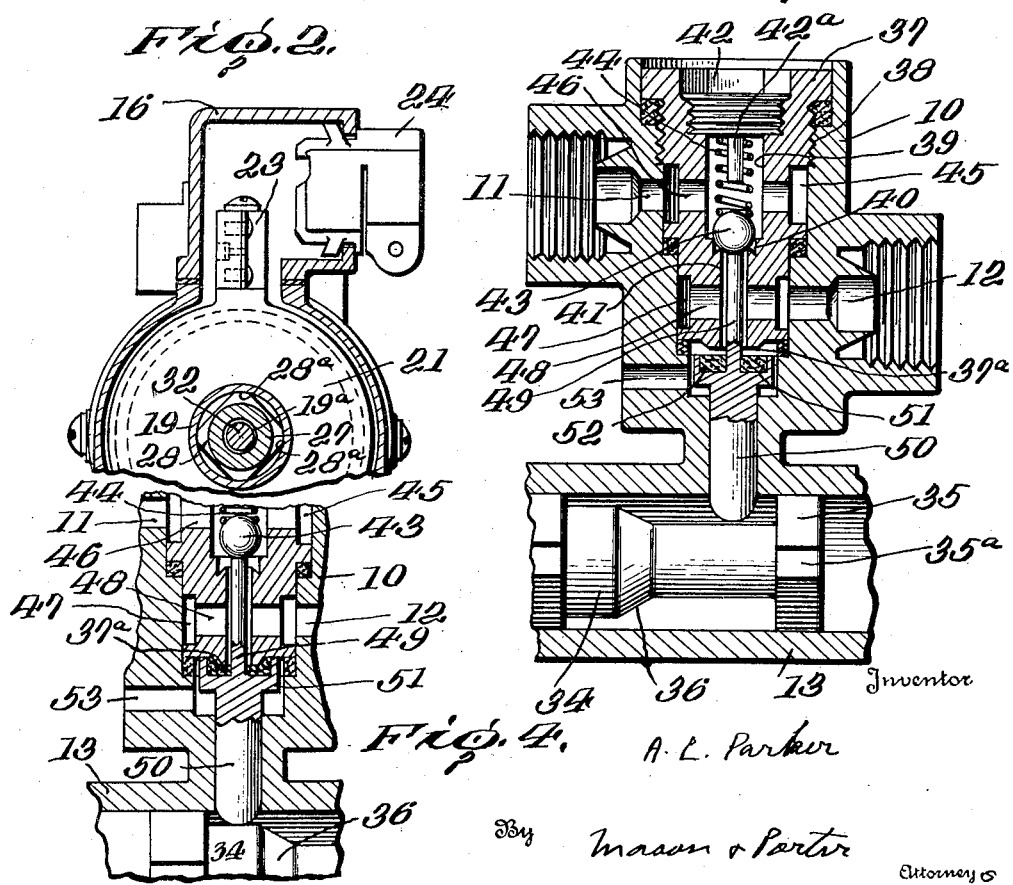
Inventor
A. L. Parker
By Mason & Porter
Attorneys Patented Apr. 2, 1940

2,196,120

UNITED STATES PATENT OFFICE 2,196,120

VALVE MECHANISM

Arthur L. Parker, Cleveland, Ohio

Application September 9, 1937, Serial No. 163,150

4 Claims. (Cl. 137—139)

The present invention relates to new and useful improvements in a valve mechanism, and more particularly to a valve mechanism for controlling the passage of fluid under pressure.

An object of the present invention is to provide a valve mechanism of the above type, wherein the valve is positively and intermittently actuated to open and close communication between inlet and outlet ports of a fluid pressure system.

A further object of the invention is to provide a valve mechanism of the above type, wherein fluid under pressure is permitted to escape from the outlet or discharge line when communication between the inlet and outlet ports is closed by the valve, and wherein the fluid under pressure is automatically prevented from escaping from the outlet or discharge line when communication between the inlet and outlet ports is open.

A still further object of the invention is to provide a valve assembly wherein a valve actuating stem is positively actuated by externally disposed mechanism so as to open the valve and provide communication between the inlet and outlet ports.

A still further object of the invention is to provide a valve assembly of the above type, wherein a reciprocable piston is employed for actuating the valve stem and wherein the piston is provided with cam means for positively opening the valve and maintaining the valve in its open position.

A still further object of the invention is to provide a valve assembly of the above type, wherein the piston is intermittently actuated by an externally disposed solenoid.

The above and other objects of the invention will in part be obvious, and will be hereinafter more fully pointed out.

In the accompanying drawing:

Figure 1 is a side view, in section, showing the improved valve assembly and the actuating mechanism therefor.

Figure 2 is a sectional end view through the valve actuating mechanism.

Figure 3 is an enlarged detailed view, in section, of the valve assembly.

Figure 4 is a fragmentary view, in section, showing the valve in its open position.

The present invention relates generally to a valve mechanism which is particularly adapted for controlling the passage of fluid under high pressure. The valve is intermittently actuated and the opening thereof is controlled by an externally disposed mechanism. The valve mechanism is thus particularly well adapted for use in high pressure systems where the fluid under pressure is to be maintained in the line for a definite length of time. The valve may be used as a pilot valve for controlling a remotely situated master valve assembly and, in this connection, the valve mechanism may be used for controlling the passage of air under high pressure to tire making machinery. A reciprocating piston is employed for positively opening the valve and movements of the piston are controlled by a pair of solenoids. The solenoids are intermittently and instantly energized in sequence to effect movement of the pistons in opposite directions. A good deal of heat is generated by relatively large solenoids, and it is for this reason that the valve is preferably used as a pilot valve so that relatively small solenoids may be employed, thus reducing the amount of heat which is generated. When the piston has been moved in one direction to positively open the valve, it will maintain the valve in its open position until one of the solenoids is again energized to return the piston to the opposite end of its stroke. When the valve is closed, means are provided for venting the air or the fluid under pressure from the discharge line. When the valve is open, the venting of the fluid under pressure is automatically prevented.

Referring more in detail to the accompanying drawing, a valve casing 10 is provided with inlet and outlet ports 11, 12 and is mounted on a cylinder 13 which is disposed at substantially right angles thereto. The cylinder 13 is provided with an annular flange 14 at one end thereof and one end of a solenoid casing 15 is secured thereto. A dome-shaped housing 16 is secured by screws or bolts 17 to the flange 14 and to the opposite end of the casing 15. A cylinder 19 has one end thereof mounted within an opening in the end of the casing 15 and has the opposite end thereof mounted in the flange 14. An annular flange 20 is provided on the cylinder 19 intermediate the ends thereof and a pair of solenoids 21, 22 are wound on the cylinder 19, one on each side of the annular flange 20. The solenoids 21, 22 are suitably insulated from one another. A panel board 23 is mounted on a supporting table 20a which is formed on the flange 20. The panel board is disposed within the dome-shaped housing 16 and the wires for the solenoids extend through a plug 24 and are properly connected to the panel board 23.

The casing 15 is provided with an annular internally threaded portion 15a in which is disposed a screw plug 25 for closing one end of the cylinder 19. The open end of the cylinder 13 is also closed by a screw plug 26. Mounted for movement within the cylinder 19 is a core member 27, the ends 28 of which are slidably fitted within the cylinder and contact therewith at spaced points 28a as shown in Figure 2. The core member 27 is provided with a central opening 29, a portion 30 of which is counterbored to provide an enlarged recess at one end thereof. A screw plug 31 threadedly engages the core member 27 and closes one end of the enlarged recess 30. A piston rod 32 extends through the opening 29 in the core member 27 and one end thereof is provided with a headed portion 33 disposed within the enlarged recess 30. The opposite end of the piston rod 32 extends through an opening 19a in the cylinder 19 and into the cylinder 13. The piston rod 32 is in axial alignment with the cylinders 19 and 13 and the end thereof extending into the cylinder 13 is secured to a piston 34 by a set screw or the like. The piston 34 is disposed within the cylinder 13 and is provided with lateral end portions 35 which are slidably fitted within the cylinder 15 and which contact therewith at spaced points 35a. The piston 34 is shaped intermediate the ends 35 thereof to provide portions of relatively large and small diameters, which portions are joined by a cam surface 36. The cam surface 36, upon movement of the piston, operates to open the valve in the manner to be hereinafter described.

The details of the valve assembly will now be described, references being had particularly to Figure 3. A valve housing 37 extends into the external casing 10 and threadedly engages a portion thereof, as at 38. The valve housing is provided with a central bore 39 which is provided at the lower end thereof with a valve seat 40. The valve seat 40 communicates with a lower bore 41 of reduced diameter. A screw plug 42 threadedly engages the housing 37 and closes the upper end of the bore 39. A ball valve 43 is disposed in the bore 39 and is adapted to contact with the valve seat 40 to close communication between the inlet and outlet ports 11, 12 in the casing 10. The screw plug 42 is provided with a depending pin 42a which extends into a coil spring 44. The coil spring 44 is thus properly located by the pin 42a and bears against the screw plug 42 and the ball valve 43 to normally urge the said ball valve into tight seating contact with the valve seat 40. The inlet port 11 in the casing 10 communicates with an annular recess 45 in the valve housing 37. Openings 46 are provided in the housing 37 to afford communication between the annular recess 45 and the bore 39. Thus, fluid under pressure entering the inlet port 11 is directed into the annular recess 45 and thence through the ports 46 into the bore 39. The width of the annular recess 45 is greater than the diameter of the inlet port 11 so that the valve housing 37 does not have to be exactly located in the casing 10, it being only necessary to insure that the port 11 will communicate with some portion of the annular recess 45. An annular recess 47 is also provided around the lower end of the valve housing 37, and is in communication with the outlet port 12. Ports 48 are provided for affording communication between the annular recess 47 and the bore 41 so that the fluid may pass therethrough.

A valve actuating stem is provided with a reduced portion 49 extending through the bore 41 and is also provided with an enlarged portion 50 extending through the casing 10 and the cylinder 13. The lower end of the portion 50 of the valve actuating stem extends into the cylinder 13 a sufficient distance so that it lies in the path of the cam surface 36 on the piston 34. The enlarged portion 50 of the valve actuating stem is provided at the upper end thereof with an annular recess 51 around the reduced portion 49 of the stem. A packing 52 is carried in the annular recess 51 and is adapted to contact with the lower end 37a of the housing 37. This lower end 37a of the housing thus affords a seat for the packing 52 when the valve stem is raised. The upper end of the enlarged portion 50 of the valve actuating stem does not completely fill the space within the casing. In this area, the casing 10 is provided with a vent port 53 which is in communication with the bore 41 when the valve actuating stem is in the position shown in Figure 3. The outer surface of the valve housing 37 and the inner surface of the casing 10 are tightly fitted together and suitable gaskets are provided to prevent leaking of the fluid.

When the valve actuating stem is in the position shown in Figure 3, the ball valve 43 is urged by the spring 44 into tight sealing contact with the valve seat 40 so that communication between the inlet and outlet ports 11, 12 is closed. In this position of the ball valve 43, the lower end of the valve actuating stem is extended into the cylinder 13 and in the path of the cam surface 36 on the piston 34. It will also be noted that, in this position of the valve actuating stem, the outlet port 12 is in communication with the vent port 53 so that any fluid under pressure remaining in the discharge line is permitted to pass into the annular recess 47, through the port or ports 48, thence through the bore 41 and out through the vent port 53. The piston 34 is disposed at the left hand end of its stroke, as seen in Figure 1, and the core member 27 is also disposed at the left hand end of the cylinder 19.

When it is desired to open the valve 43 to afford communication between the inlet and outlet ports 12 in the valve casing 10, the solenoid 22 is energized. When the coil 22 is energized, the core member 27 will be urged toward the right (Figure 1), that is, into the coil 22. Initial movement of the core member 27 does not effect movement of the piston rod 32 since there is lost motion between the piston rod and the core member until the headed portion 33 of the piston rod 32 abuts against the inner end of the plug 31. During initial movement of the core member 27, sufficient momentum is developed to cause the piston rod and the piston 34 to be forcibly shifted to the right when the end of the plug 31 strikes the headed portion 33 on the piston rod. This movement of the piston will bring the cam surface 36 into engagement with the lower end of the valve actuating stem and force the stem upwardly. The valve actuating stem will remain open by contact of the lower end thereof with the large diameter portion of the piston 34, as shown in Figure 4. During upward movement of the valve actuating stem, the reduced portion 49 will engage and positively lift the ball valve 43 from the valve seat 40, thus affording communication between the inlet and outlet ports 11, 12. While the ball valve 43 is maintained in open position by the actuating stem, the packing 52 will engage the valve seat 37a (Figure 4) and thus tightly seal and close the lower end of the bore 41. This sealing of the lower end of the bore 41 will prevent the escape of fluid while the valve 43 is open.

When it is desired to close communication between the inlet and outlet ports 11, 12, the solenoid 21 is energized and this tends to draw the core member 27 to the left, that is, into the coil 21. There is also lost motion between the piston rod 32 and the core member 27 during the initial movement of the core member in the reverse direction. This initial movement of the core member 27 develops sufficient momentum to aid in shifting the piston and piston rod to the left when the core member engages the headed portion 33 on the piston rod 32. This reverse movement of the piston 34 will retract the large diameter portion thereof and the cam surface 36 away from the lower end of the valve actuating stem so that the spring 44 will seat the valve 43 and return the valve actuating stem to the position shown in Figure 3. Thus, the ball valve 43 will close communication between the inlet and outlet ports 11, 12. At the same time, the packing 52 will be removed from sealing contact with the valve seat 37a so that communication is now afforded between the outlet port 12 and the vent port 53. In this manner, any fluid under pressure remaining in the discharge line will be automatically vented through the port 53 when the valve 43 is closed.

The coils 21, 22 of the solenoid are energized by a remotely situated timing unit (not shown), which may be of any conventional type. In fact, the solenoid may be actuated by a manual control, if desired. It is preferred, however, that a timing unit be employed for energizing the coils separately and in sequence for effecting reciprocation of the piston 34 in accordance with a predetermined time schedule. It is not intended that either one of the coils remain energized for any appreciable length of time and preferably each of the coils are instantly energized and then the circuit broken when the core has completed its stroke in either direction, so that there will be a minimum amount of heat generated by the solenoid. The ends 35 of the piston 34 contact with the cylinder 13 at spaced points so that air is permitted to pass therebetween. Similarly, the ends 28 of the core member 28 contact with the cylinder 19 at spaced points so that the air may be freely circulated. This affords a convenient means of cooling the mechanism upon reciprocation of the piston and core. When the piston 34 has been moved to a position for raising the valve operating stem, the said stem will remain in raised position, with the valve 43 open, because of the contact of the lower end thereof with the enlarged portion of the piston 34. Thus, the coil 22 does not have to remain energized.

From the foregoing description it will be seen that a highly efficient valve mechanism is herewith provided. The valve mechanism is of the type which will be intermittently and positively operated by a remotely situated timing mechanism. A minimum amount of heat is generated by the solenoid actuating mechanism and free circulation of air within the cylindehs 19 and 13 is permitted.

It is to be clearly understood that various changes in the details of construction and arrangement of parts may be made without departing from the scope of the invention as set forth in the accompanying claims.

I claim:

1. A valve assembly comprising a casing, inlet and outlet ports in said casing, a valve housing disposed within said casing and having communicating bores of different diameters extending longitudinally thereof, said bores affording communication between said inlet and outlet ports, means including transverse passages in said valve housing for affording communication between said bores and said inlet and outlet ports, a valve seat between said bores, a valve member located in the larger of said bores and operating to close communication between the inlet and outlet ports, a vent port in said casing below said valve housing and communicating with the smaller of said bores and with said outlet port, a valve actuating stem disposed within the smaller of said bores and extending exteriorly of said casing, means engageable with the exterior end of said stem for positively shifting the said stem to remove said valve member from said valve seat whereby to afford communication between the inlet and outlet ports through said bores, and means carried by said valve actuating stem and engageable with the lower end of said valve housing for sealing the end of the smaller of said bores when said valve member is removed from said valve seat whereby to close communication between said vent port and said outlet port.

2. A valve assembly comprising a casing, inlet and outlet ports in said casing, a valve housing disposed within said casing and having a bore extending longitudinally thereof, said bore affording communication between said inlet and outlet ports, a valve seat intermediate the ends of said bore, a valve member located within said bore and adapted to cooperate with said seat for controlling communication between said inlet and outlet ports, said valve housing having a pair of annular recesses formed around the outer surface thereof, one of said recesses being disposed on one side of said valve seat and affording communication between said bore and said inlet port and the other of said recesses being disposed at the opposite side of said valve seat and affording communication between said bore and said outlet port, a valve actuating stem extending into the portion of said bore below said valve seat and adapted to operate said valve member, spring means for normally seating said valve member, means for positively shifting said valve actuating stem for removing said valve member from said valve seat whereby to afford communication between said inlet and outlet ports, a vent port in said casing below said valve housing and adapted to communicate with said bore and with said outlet port, and means carried by said valve actuating stem and engageable with the lower end of said valve housing for sealing the end of said bore when said valve member is removed from said valve seat whereby to close communication between said vent port and said outlet port.

3. A valve assembly comprising a casing, inlet and outlet ports in said casing, a valve housing disposed within said casing and having a bore extending longitudinally thereof, said bore affording communication between said inlet and outlet ports, a valve seat intermediate the ends of said bore, a valve member located within said bore and adapted to cooperate with said seat for controlling communication between said inlet and outlet ports, said valve housing having a pair of annular recesses formed around the outer surface thereof, one of said recesses being disposed on one side of said valve seat and in communication with said outlet port and the other of said recesses being disposed on the opposite side of said valve seat and in communication with said inlet port, means providing transverse passages in said valve housing for affording communication between said annular recesses and said bore, a valve actuating stem disposed in the portion of said bore below said valve seat and extending exteriorly of said casing, said actuating stem being adapted to remove said valve member from said valve seat, spring means for normally seating said valve member, means engageable with the exterior end of said actuating stem for positively shifting the said stem to remove said valve member from said valve seat whereby to afford communication between the inlet and outlet ports through said bore, said annular recesses and said transverse passages; a vent port in said casing below said valve housing and adapted to communicate with said bore and with said outlet port, and means carried by said valve actuating stem and engageable with the lower end of said valve housing for sealing the end of said bore when said valve member is removed from said valve seat whereby to close communication between said vent port and said outlet port.

4. A valve assembly comprising a valve casing, inlet and outlet ports in said valve casing, valve means for controlling the passage of fluid through the ports in said valve casing, spring means for normally closing said valve means, a valve actuating stem operable for positively opening said valve means to permit the passage of fluid through said ports, a cylinder connected to said valve casing and into which one end of said valve actuating stem extends, the longitudinal axis of said cylinder being disposed at right angles to the longitudinal axis of said valve actuating stem, a piston freely reciprocable within said cylinder and having spaced annular head portions contacting with the inner wall of said cylinder at spaced points whereby to permit unrestricted movement of said piston within said cylinder, cam means associated with said piston for positively shifting said valve actuating stem whereby to open said valve means, a piston rod connected to said piston and extending outside of said cylinder, a casing connected to said cylinder and having a second cylinder disposed therein in axial alignment with said first cylinder, said piston rod extending into said second cylinder, a pair of electric solenoid coils surrounding the said second cylinder within said last mentioned casing and adapted to be alternately energized, a core member disposed within said second cylinder and having spaced annular head portions contacting with the inner wall of said second cylinder at spaced points whereby to permit limited unrestricted movement of said core member in said second cylinder, said core member having a longitudinal opening through which said piston rod extends and an enlarged internal closed recess, and a head on the free end of said piston rod within said enlarged recess, said enlarged recess within said core permitting limited unrestricted movement of said core member relative to said piston rod whereby the core member develops momentum prior to the actual engagement of the core member with the piston rod in order to facilitate the shifting of said piston rod and the piston in said first cylinder.

ARTHUR L. PARKER.